United States Patent [19]

Black et al.

[11] Patent Number: 4,984,146
[45] Date of Patent: Jan. 8, 1991

[54] SUPPRESSION OF RADIATED EMI FOR POWER SUPPLIES

[75] Inventors: Arthur G. Black, Red Hook; John R. Mazzuca, Kingston; Carl J. Palmucci, Kingston; Surya K. Rao, Kingston, all of N.Y.

[73] Assignee: International Business Machines Corporation, Armonk, N.Y.

[21] Appl. No.: 499,835

[22] Filed: Mar. 27, 1990

[51] Int. Cl.⁵ .............................................. H02M 7/06
[52] U.S. Cl. ......................................... 363/44; 363/126
[58] Field of Search ....................... 363/39, 44, 47, 48, 363/126

[56] References Cited

U.S. PATENT DOCUMENTS

| | | | |
|---|---|---|---|
| 3,963,975 | 6/1976 | Gauper, Jr. et al. | 307/91 |
| 4,041,364 | 9/1977 | Gauper, Jr. | 363/15 |
| 4,320,307 | 3/1982 | Schierjott | 307/91 |
| 4,481,426 | 11/1984 | Nakagawa et al. | 307/91 |
| 4,567,404 | 1/1986 | Flugan | 363/44 |
| 4,580,112 | 4/1986 | Winslow et al. | 333/12 |
| 4,703,195 | 10/1987 | Bailey | 307/147 |
| 4,730,243 | 3/1988 | Glennon | 363/126 |
| 4,823,249 | 4/1989 | Garcia | 363/48 |
| 4,841,429 | 6/1989 | McClanahan et al. | 363/126 |

*Primary Examiner*—Steven L. Stephan
*Assistant Examiner*—Jeffery Sterrett
*Attorney, Agent, or Firm*—Blaney Harper; Maurice H. Klitzman; Robert L. Troike

[57] ABSTRACT

This invention provides a means for suppressing radiated electromagnetic radiation in high current AC/DC power supplies. This radiation is the result of rectifier diode transient noise which is propagated through the electrical network of the power supply. The transient noise is propagated through the electrical and mechanical connections of the diodes to the transformer secondary. These connections have stray impedance which allows high frequency noise to be propagated through them. The stray impedances can be modulated to suppress the high frequency noise propagation without adding discrete inductor or capacitor elements to the electrical network. The modulation of the stray impedances is accomplished by adjusting the current sharing between rectifier diodes. This is accomplished by splitting the parallel connection between rectifier diodes, and making the connection of the diodes to the transformer secondary at various points along the secondary. The separate impedance of both the transformer and the individual connections will modulate the existing stray impedance to suppress the radiated electromagnetic noise.

8 Claims, 6 Drawing Sheets

SUPPRESSION OF RADIATED EMI FOR POWER SUPPLIES

FIELD OF THE INVENTION

This invention relates generally to the field of electromagnetic radiation suppression. More specifically, the invention relates to suppressing high frequency radiated electromagnetic interference in switching mode power supplies.

BACKGROUND OF THE INVENTION

Switching mode power supplies provide a means of converting an A/C power source into a D/C power source. The means of converting the power source from A/C to D/C includes a rectifier which blocks the transmission of one half of an A/C waveform. The A/C waveform is placed across a diode within the rectifier add when the waveform is essentially in a first phase the diode conducts current. When the diode is essentially in a second phase the diode does not conduct current. When the diode makes the transition from conducting (i.e., on) to non-conducting (i.e., off), a high frequency ringing current occurs during turn off. This current produces an undesirable signal noise or electromagnetic interference (EMI). This is especially true of high current power supplies. The electromagnetic interference can be one of two types, a) conducted or b) radiated. Conducted EMI is primarily emitted and measured at the A/C input of the power supply and has a relatively low frequency of generally less than 10MHz. Radiated EMI is typically emitted at a high frequency, and is measured at any number of places around the power supply. Generally, power supplies have been shielded to suppress the escaped EMI, however, the shielding has only limited effect depending on the frequency of the EMI. The higher the frequency of the EMI, the less effective the shielding, because the shield capacitively passes the interference to the surroundings.

The D/C current flow generated by the power supply is a result of the rectifier diodes being continually switched on and off. This switching generates noise on the internal nodes of the power supply due to ringing in the circuit. That is, the electrical elements in the power supply have been formed in such a manner as to allow voltage transient signals, from switching the diode from "on" to "off", to propagate through the circuit. The noise propagates into the area surrounding the power supply as electromagnetic interference because of the A/C nature of the ringing signal and the capacitive nature of the power supply with respect to surrounding objects. The transients are a result of the stray impedance inherent in the circuit as a result of the mechanical size of a high current power supply Also, the more current the power supply handles, the larger the transients become and the bigger the EMI problem. The stray impedances, and therefore the EMI, can be suppressed or shifted in frequency but not eliminated because stray impedance is a part of mechanically building the power supply.

Prior art techniques have tried to suppress the problem by putting a discrete inductor in series with the rectifier diode. The inductor acts to not allow the current through the diode to change significantly faster than the switching required by the A/C signal on the secondary winding of the power supply. This is an effective method of suppressing the EMI from the rectifier circuit, however, it has two problems. First, the inductor has its own stray capacitance from being assembled into the power supply. As a result, the EMI will not be effectively suppressed by the inductor because the capacitance will pass high frequency noise. Second, typical ferrite core inductors have core leakage, acoustic noise (low frequency), and voltage regulation problems in addition to and separate from EMI problems.

Both the shielding and the discrete element network solution to the radiated EMI problem are not effective for the same basic reason. This is that high frequency effects in power supplies are generated because of parasitic elements inherent in the power supply design. Changing the basic design of the power supply does not significantly increase control over the parasitic effects, and therefore, control over the high frequency effects is limited.

OBJECTS OF THE INVENTION

It is the object of this invention to improve AC to DC switching mode power supplies It is another object of this invention to improve AC to DC switching mode power supplies by suppressing the radiated electromagnetic interference.

It is a further]object of this invention to improve AC to DC switching mode power supplies by suppressing the radiated electromagnetic interference independently from suppressing conducted electromagnetic interference.

It is still another object of this invention to improve AC to DC switching mode power supplies by suppressing radiated EMI without adding discrete elements to the power supply circuit.

SUMMARY OF THE INVENTION

This invention suppresses radiated EMI by recognizing that the existing mechanical connections of the power supply are the source of stray impedance which propagate transient noise from the snap back of the rectifier diodes within the power supply. These mechanical connections are modified to adjust the electrical behavior of the power supply network which, in turn, modulates the radiated EMI. Modifying the existing connections between elements in the power supply suppresses the radiated EMI without adding discrete elements to the power supply network. Adding discrete elements to the network is not effective to suppress radiated EMI because stray impedance from the connections exacerbate the interference problem. Adding elements merely adds more stray wiring to the network and, while suppressing interference in one frequency band, it typically exacerbates the problem in another frequency band. This invention avoids that problem by not adding stray impedance but modifying the existing stray impedance directly.

PREFERRED EMBODIMENT

Figure 1:
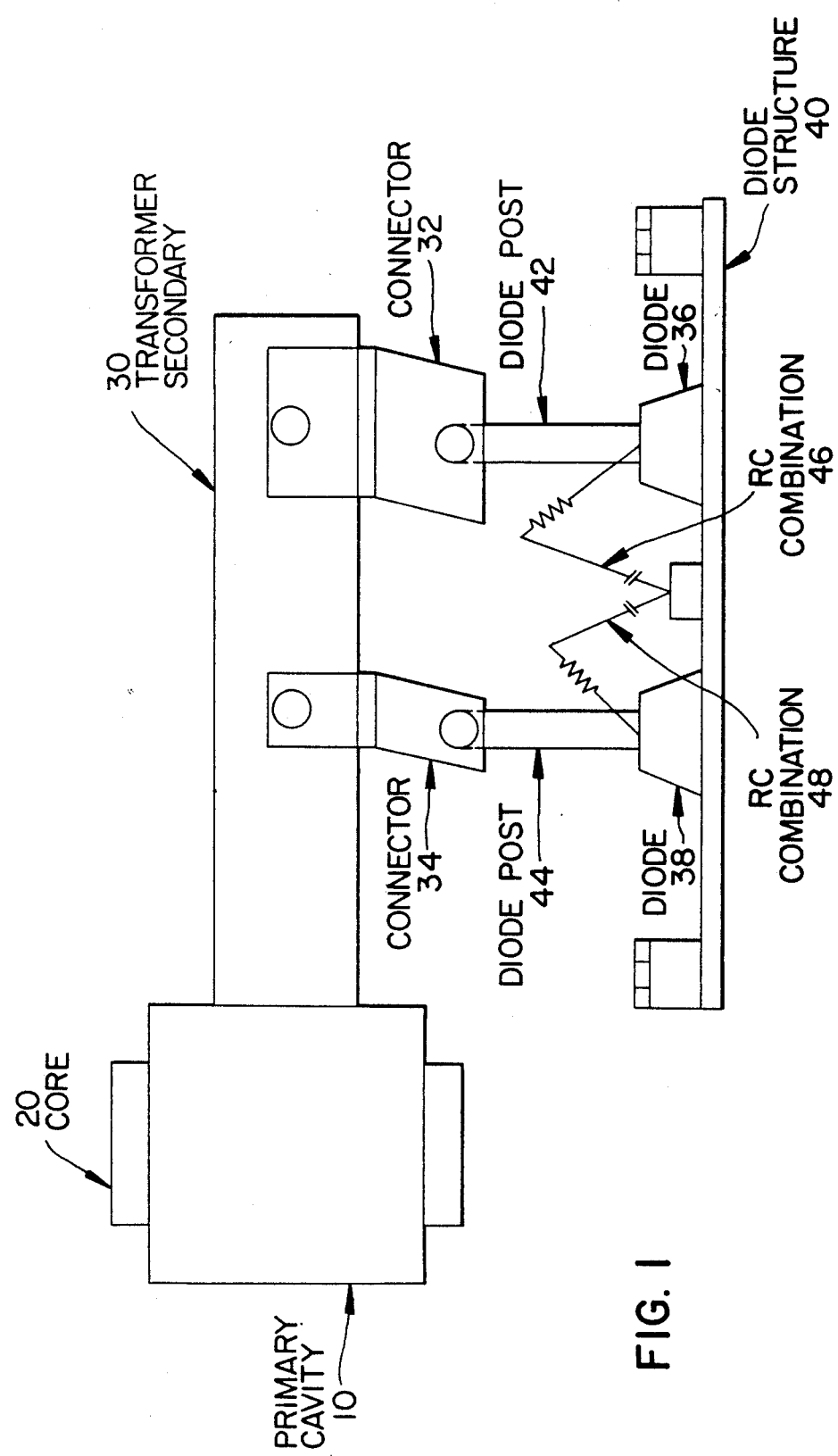
FIG. 1 illustrates a first embodiment of the present invention, specifically showing the mechanical connections of the elements of the power supply.

A preferred embodiment of the present invention is shown in FIG. 1 with respect to a power supply. In general, impedances in series with the rectifier diodes of this power supply are adjusted in two ways first, the position of each mechanical connection is adjusted with respect to both the primary cavity and to the other mechanical connection, second, each electrical connection is physically formed to provide specific electrical behavior with respect to the other electrical connection. Since the electrical and mechanical connections are both made through the same material, changing the physical size and placement of the connector adjusts the electrical impedances in series with the rectifier diodes. These impedance modifications modulate the current sharing between the rectifier diodes and as a result suppress, and shift in frequency, radiated EMI.

More specifically, to explain the invention for illustrative purposes, the power supply has a primary cavity housing 10 and an associated core 20. The transformer secondary winding 30 is attached to the housing of the primary cavity 10. The transformer secondary winding is a stack of metal plates formed in such a way as to provide multiple current loops, and having connections between levels in the stack such that a secondary winding is formed. The secondary winding has from one to five turns in this embodiment, however, it may have many more. The transformer secondary 30 has one end of the winding connected to an output diode structure 40 through electrical conductors 32 and 34. The electrical conductors 32 and 34 connect the secondary 30 to two diode posts 42 and 44 respectively on the diode structure 40. The diode posts 42 and 44 connect the electrical conductors 32 and 34 to the diodes 36 and 38 respectively. Diodes 36 and 38 are illustrated as single diodes but may be separate groups of diodes connected in parallel depending on the current rating desired. Each diode has a series RC combination 46 and 48 connected from the anode (or diode post connection) to the cathode.

Figure 2:
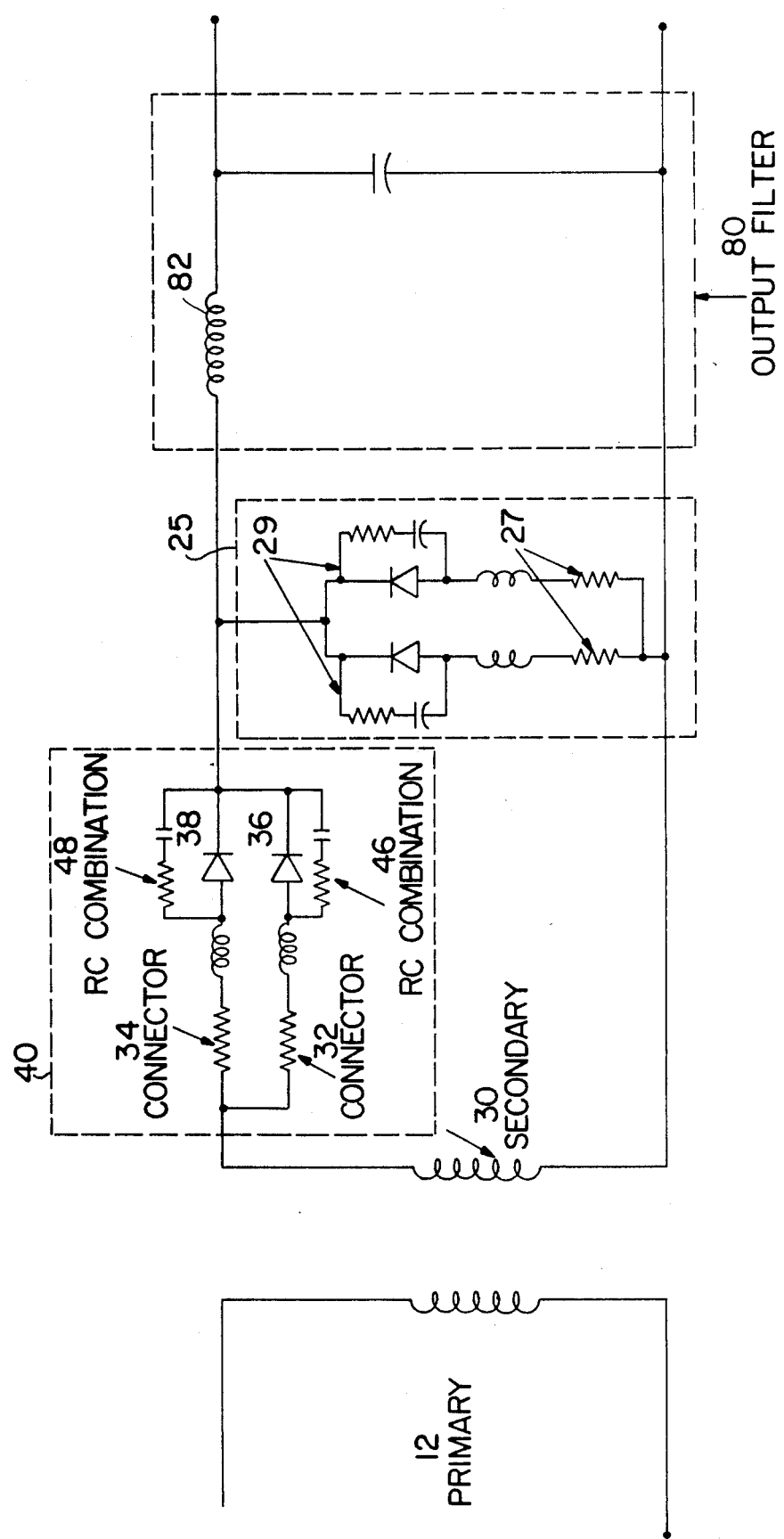
FIG. 2 illustrates the electrical equivalent circuit of the power supply having the mechanical connections as shown in FIG. 1.

FIG. 2 illustrates the electrical equivalent of the power supply. It shows that the cathode of the first diode structure 40 is connected to the cathode of a filter diode 25 and to the first input of an output filter 80. The anode of the filter diode 25 is connected to both the second end of the secondary winding 30 and the second input of the output filter 80. The filter diode 25 is mechanically similar to the first diode structure 40. There are two diodes, each having an RC combination 29 in parallel with the individual diode, and being in series with an electrical conductor 27 similar to the first diode structure electrical conductors 32 and 34. The diodes in series with the electrical conductors are then connected in parallel similar to the first diode structure. The output filter 80 is a low pass LC network which operates as a second order filter. The network can be varied significantly depending on the characteristics of the overall power supply desired.

OPERATION OF THE PREFERRED EMBODIMENT

The general operation of the power supply is similar to conventional power supplies in that the A/C power supply voltage is applied to the primary 12. This signal is approximately 300 volts Peak to Peak, at 33 KHz. This signal generates a current and voltage in the secondary winding of the transformer. When the A/C power supply voltage is in a first phase (the upper half of the peak to peak voltage differential), the current flows from the secondary into the diode structure 40. The diode structure 40 is biased in the conductive state, from the voltage generated in the secondary and it allows the current to pass through the diode structure 40 to the filter diode 25 cathode connection and into the output filter 80. The filter diode 25 is biased in its non conducting state during the first phase of the A/C power supply voltage. When the second phase of the A/C power supply voltage is applied to the primary 12, the diode structure 40 turns off, and the filter diode 25 is essentially isolated from the secondary 30 by the diode structure 40. The filter diode 25 then conducts a D/C current maintained by an inductor 82 in the the low pass output filter 80. The constant charging and discharging of the inductor 82 in the low pass output filter 80 results in a steady D/C current flow at a reduced output voltage, 3.6 volts in this embodiment although a wide range of output voltages may be designed.

The D/C current flow generated in the power supply is a result of the diodes in the diode structure 40 being continually switched on and off and charging and discharging the output filter inductor 82. Switching the diodes on and off causes transient voltage noise to appear on the power supply electrical nodes. This noise is transmitted to the area surrounding the power supply as electrical interference because of the capacitive nature of the power supply with respect to the surroundings. When the transient noise approaches 10MHz, the capacitance of the power supply transmits enough of the noise to constitute significant electrical interference. This is when the interference is denominated as radiated EMI and the frequency at which it begins will vary with specific power supply designs.

Although the general operation of this power supply is similar to conventional power supplies, its operation with respect to radiated EMI is not conventional. The diode switching generates noise on the internal nodes of the power supply due to ringing in the circuit. The noise propagates into the area surrounding the power supply as electromagnetic interference. The ringing is a result of the stray impedance added into the circuit as a result of the mechanical structure of the power supply. The stray impedances can be minimized, and therefore the EMI can be suppressed or shifted in frequency, but the stray impedances cannot be eliminated because they are a part of mechanically building the power supply. Prior art has used ferrite core inductors in series with the diode structure 40 and 25 to suppress radiated EMI. The effectiveness of this has been limited because of the inductors own stray impedance and because the inductors have their own core leakage, acoustic noise (low frequency), and voltage regulation problems aside from EMI problems.

Figure 3:
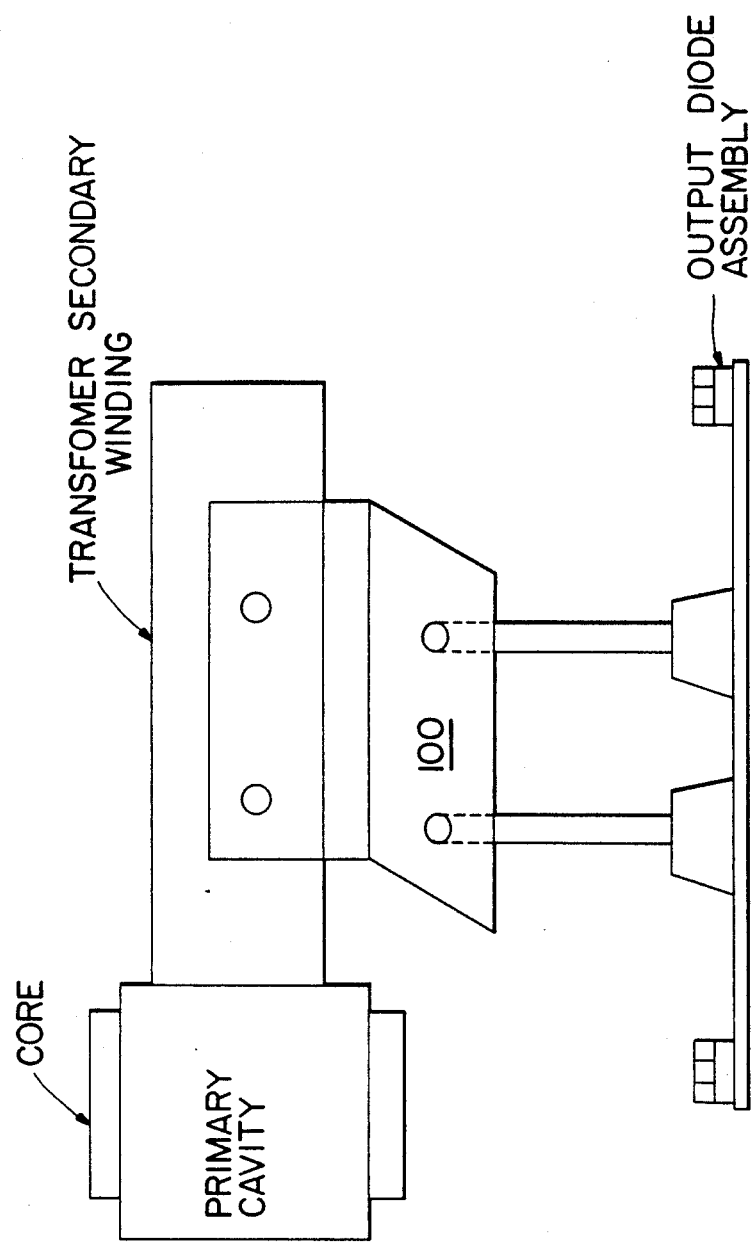
FIG. 3 illustrates the conventional mechanical connections of the elements of the power supply.

The present invention minimizes EMI by splitting the parallel electrical connection between diodes in the diode structure 40 and in the filter diode 25. FIG. 3 shows the conventional mechanical and electrical connection of the diodes to the secondary winding. There is one connector 100 which electrically connects the secondary winding 30 with respect to the individual diodes. In contrast, FIG. 1 shows that conductor 32 is in series with diode 36 and provides a first impedance, and conductor 34 is in series with diode 38 and provides a second impedance. Both impedances are connected to one end of the secondary winding. The conductors 32 and 34 have stray inductance, resistance, and capacitance. They are suppression networks by themselves. The present invention uses the impedance of the secondary 30, as well as the differences in the electrical characteristics of the conductors themselves, to modulate the radiated EMI. The separate adjustment of each of the impedances provides the ability to effectively suppress radiated EMI. Instead of trying to add components which compensate for the stray impedance problem, merely adjusting an existing source of the problem provides an enhanced result.

FIG. 1 shows that conductor 34 and diode 38 is closer to the primary cavity 10 than conductor 32 and diode 36. The diodes are identical in electrical performance so that given identical electrical conductors, current would be shared unequally between the two diodes solely because of the diode position on the transformer. The spatial adjustment of the diode position on the transformer secondary with respect to both the primary core and the second diode is therefore one parameter to modulate the stray impedance of the diode structure network. Additionally, the electrical characteristics of the conductors themselves may be changed by making the conductor a different shape or making it out of different material. Since the impedance of a conductor itself affects the current sharing between diodes in a similar fashion to the effects of positioning conductors on the transformer secondary, the electrical characteristics of the conductor is a second parameter to modulate the stray impedance of the diode structure. The common connection of the diodes in the prior art did not allow independent modulation of the current sharing for each diode. Additionally, the prior art did not separate the use of the impedance of the diode connection from the use of the impedance of the transformer secondary. The use of the two parameters separately provides enhanced ability to minimize EMI.

Figure 4:
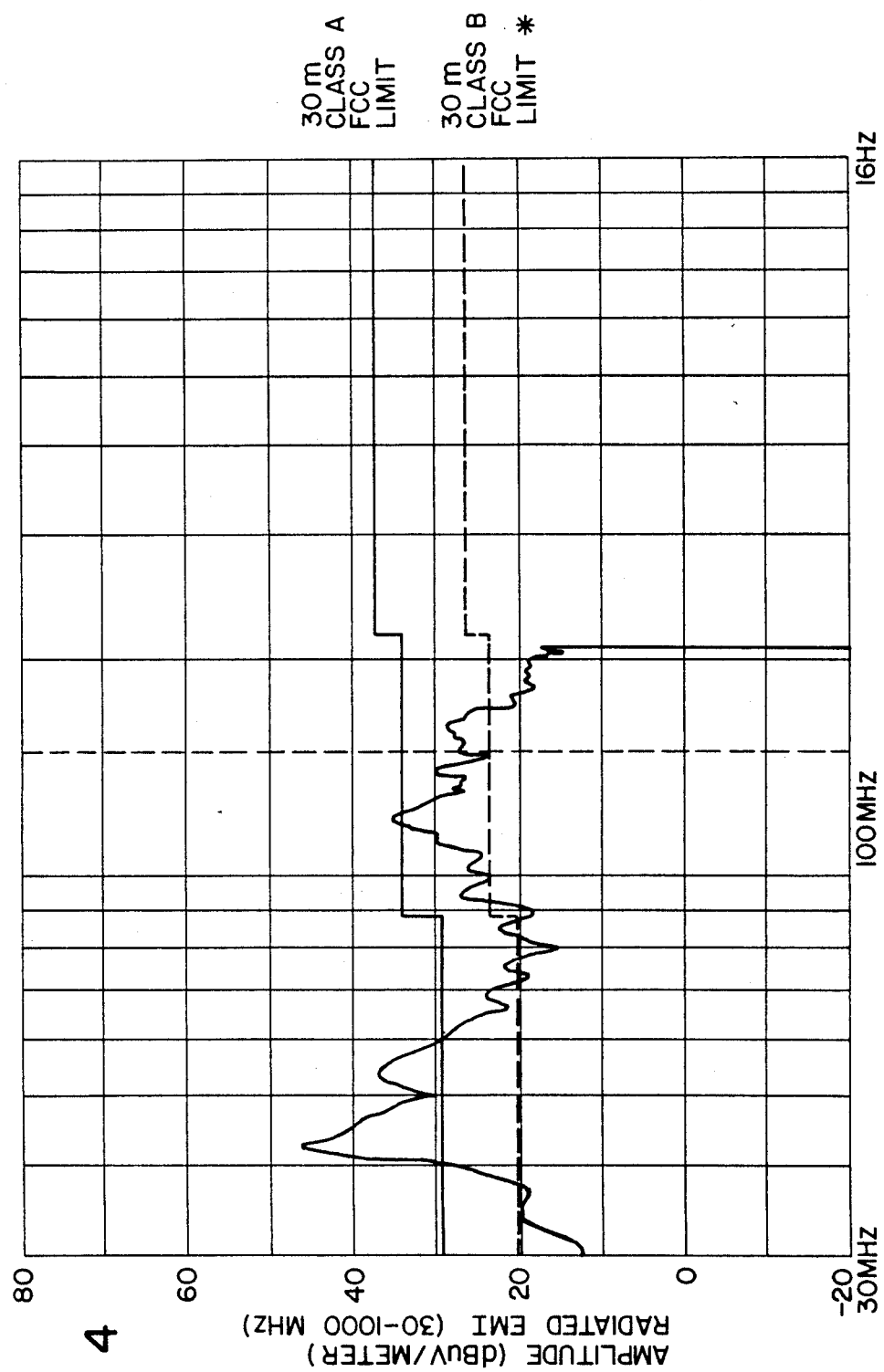
FIG. 4 illustrates the resulting measurements of radiated EMI in a power supply not utilizing the present invention.
Figure 5:
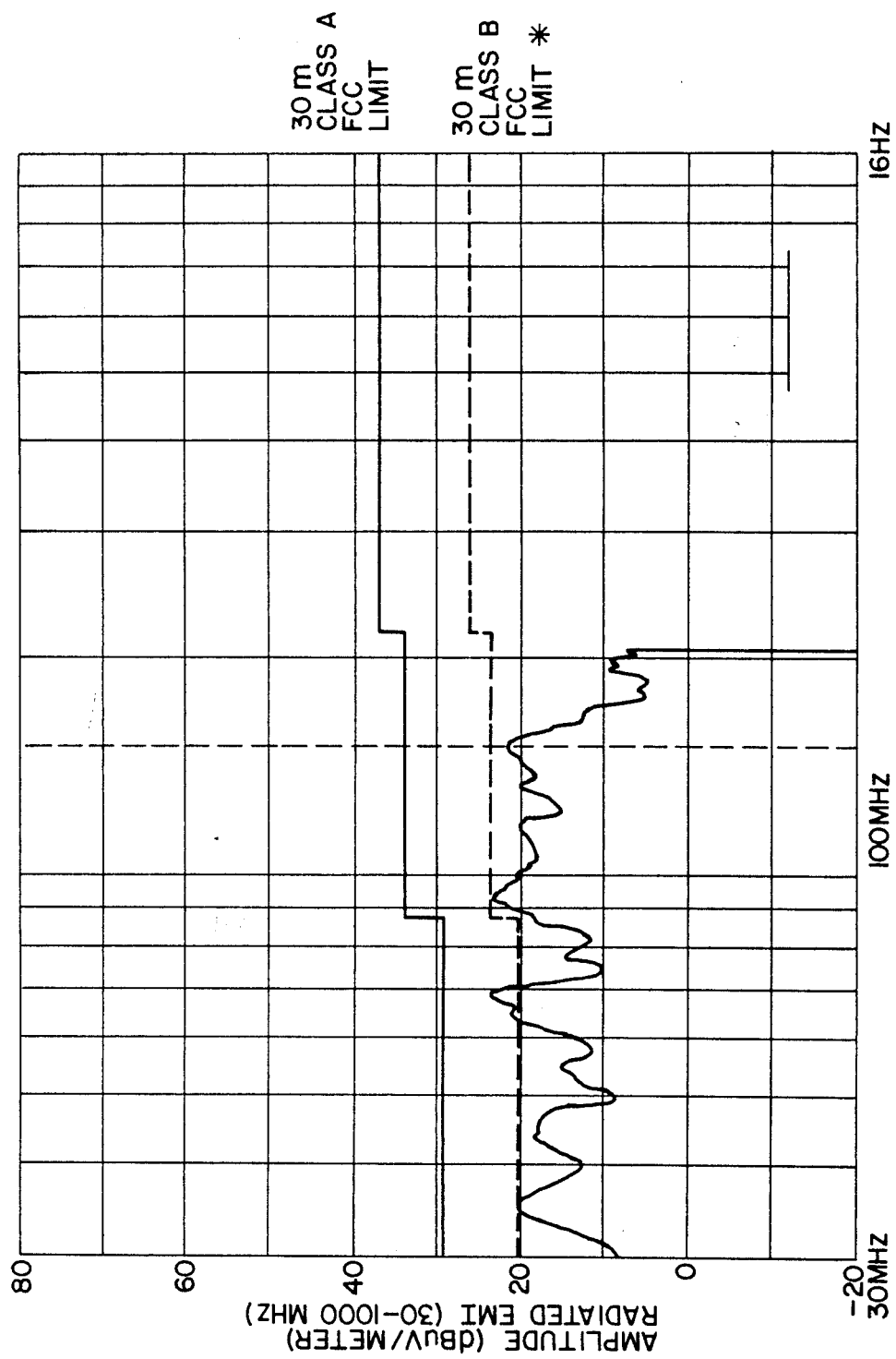
FIG. 5 illustrates the resulting measurements of radiated EMI in a power supply utilizing the present invention.

In this embodiment, the conductors are made out of copper, are 0.3 millimeters thick, and the connections to the conductors are spaced 6 millimeters apart. Additionally the conductors are different widths, with conductor 34 being approximately 9/10 the width of conductor 32. The conductors could be thicker, wider, or made from different electrical conducting material such as tin, lead, gold, or some combination. Additionally, the conductors could be made of a combination of insulators and conductors such as a ceramic material sandwiched between two copper conductor plates or the like. The shape and material of the conductor determine the electrical performance of the conductor. The effect of modulating the impedance with the position and conductor parameters can be seen in FIGS. 4 and 5. FIG. 4 is a typical measurement of radiated emission of a 3.6 volt power supply operating at 725 Amps with a single connector as shown in FIG. 3. FIG. 5 is a the same measurement with separate conductors positioned and shaped as described above. Two prominent differences are illustrated. First, the radiated EMI is significantly suppressed by approximately 20dB (uV/Meter). Second, the peak radiated EMI is shifted further down in frequency. The two differences in the radiated EMI spectrum illustrate the effectiveness of this technique for minimizing radiated EMI.

SECOND EMBODIMENT

Figure 6:
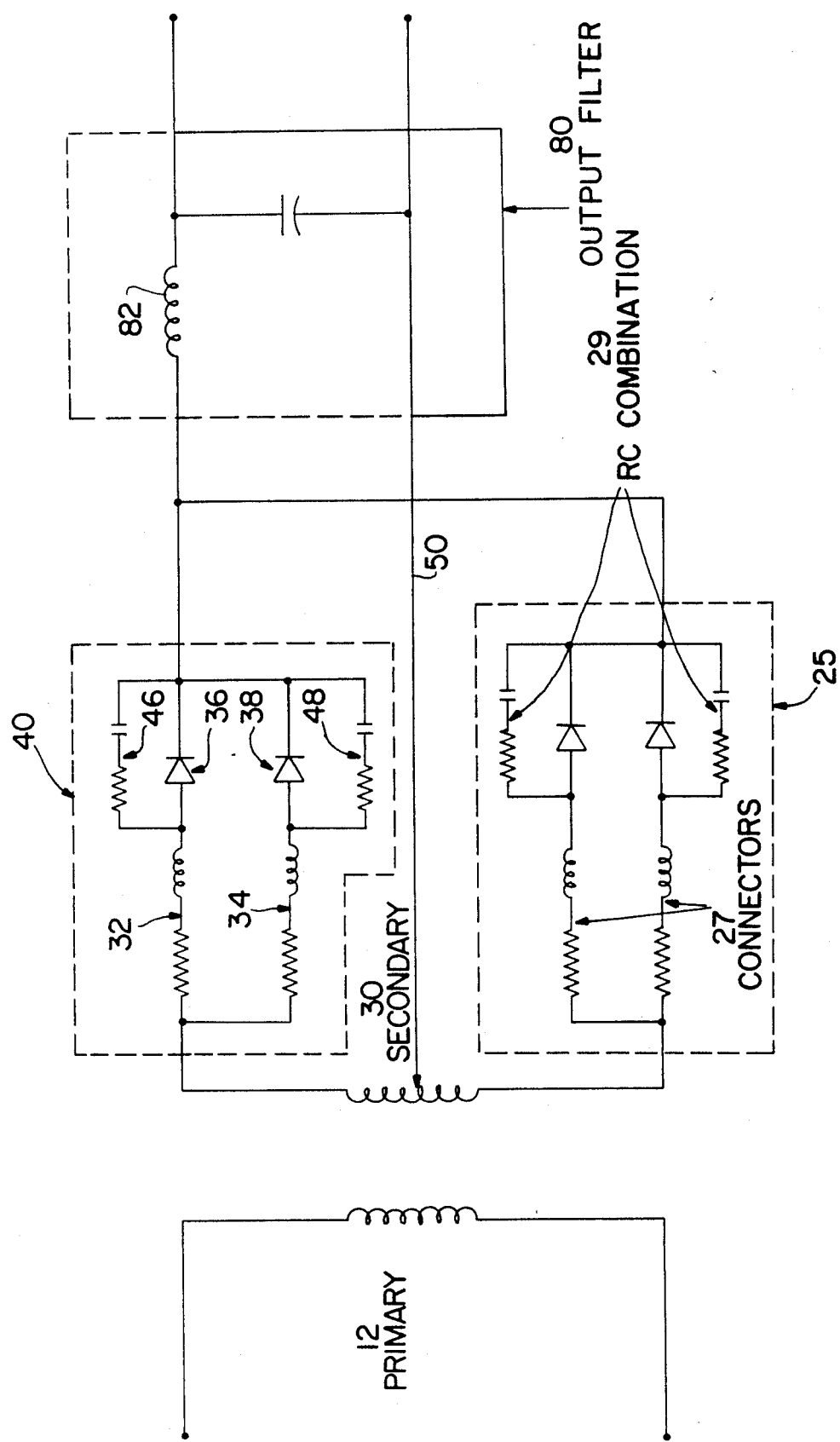
FIG. 6 illustrates a second embodiment of the present invention, specifically illustrating the electrical circuit of the mechanical connections of the elements of the power supply.

FIG. 6 illustrates a second embodiment of this invention as applied to a full wave rectifier. In this embodiment, the secondary winding 30 is center tapped. The center tap connection 50 is connected to the second input of the output filter 80. The first input to the output filter 80 is, as in the first embodiment, the common cathode connection between the diode structure 40 and the filter diode 25. Also, as in the first embodiment, each end of the secondary winding 30 is connected to an anode of a diode through individual conductors. In the diode structure 40, the anode of diode 36 is connected to one end of the secondary winding 30 through conductor 32, and the anode of diode 38 is connected to the same end of the secondary winding through conductor 34. Diodes 36 and 38 each have RC combinations, 46 and 48 respectively, connected to them in parallel. Similarly, the second end of the secondary winding 30 is connected to the anodes of two diodes, making up the filter diode 25, through two conductors 27 Each of the diodes has an RC combination 29 connected to them in parallel. The cathodes of the diodes are commonly connected to the first input of the output filter 80.

OPERATION OF THE SECOND EMBODIMENT

The general operation of this power supply is similar to conventional fullwave power supply circuits. An A/C power supply voltage is applied to the primary 12 which is approximately 300 volts Peak to Peak, at 33KHz. This voltage signal generates a current and voltage in the secondary winding 30. During a first phase of the A/C signal (the upper half of the peak to peak voltage), the current flows from the secondary 30 into the diode structure 40. The diode structure 40 passes the current into the output filter 80 during this first phase. When the A/C signal is in a second phase (lower half of the peak to peak voltage), the current flows from the secondary 30 into the filter diode 25. The filter diode 25 passes the current into the output filter 80 during the second phase. The output filter inductor 82 maintains a constant current flowing through the output filter 80 during the first and second phases of the A/C power supply signal as well as during the transition between the two phases.

The power supply current is generated by the constant charging and discharging of the output filter inductor 82 through the diode structure 40 and the filter diode 25. Radiated EMI is generated from the associated diode switching. This invention suppresses radiated EMI by individually adjusting the impedance of each conductor connected to the diodes. The adjustment in impedance is made either through the adjusting the size and shape of the individual conductor or through its placement on the secondary winding with respect to the primary core. In either case, the current sharing between diodes is changed and radiated EMI is reduced without adding discreet elements to the circuit which exacerbate the stray impedance source of the radiated EMI problem.

While this invention has been particularly described and illustrated with reference to a preferred embodiment thereof, it will be understood by those skilled in the art that changes in the above description or illustrations may be made with respect to form or detail without departing from the spirit and scope of the invention.

I claim:

1. An electrical power supply comprising:
   primary and secondary windings;
   an output filter;
   a first diode having an anode electrically connected to a first end of said secondary winding and a cathode connected to a first input of said output filter, said first diode anode connection having a first series impedance between said secondary winding and said first diode anode;
   a second diode having an anode electrically connected to a first end of said secondary winding and a cathode connected to said first input of said output filter, said second diode anode connection having a second series impedance between said secondary winding and said second diode anode;
   said first diode anode connection spaced apart from said second diode anode connection and from said secondary winding to provide separately adjustable impedances for each of said anode connections;
   said first series impedance and said second series impedance suppressing radiated electromagnetic interference; and
   a second end of said secondary winding connected to a second input of said output filter.

2. An electrical power supply as in claim 1, wherein;
   said first diode anode connection comprises different electrically conducting materials from said second diode anode connection.

3. An electrical power supply as in claim 1, wherein;
   said first diode anode connection has a first series impedance adjustment means and said second diode anode connection has a second series impedance adjustment means.

4. An electrical power supply as in claim 1, wherein;
   said first diode impedance includes a first secondary winding impedance determined by said spacing between said secondary winding and said first diode anode connection, said second diode impedance includes a second secondary winding impedance determined by said spacing between said first and said second diode anode connections, said first secondary winding impedance having an adjustment means with respect to said second secondary winding impedance which suppresses radiated electromagnetic interference.

5. An electrical power supply comprising:
   primary and secondary windings;
   an output filter;
   a plurality of diodes having anodes electrically connected to a first end of said secondary winding and cathodes connected to a first input of said output filter, said plurality of anode connections having a plurality of series impedances between said secondary winding and each of said plurality of anode connections;
   each of said plurality of series impedances being separately adjustable from other series impedances within said plurality;
   each of said plurality of impedances suppressing radiated electromagnetic interference; and
   a second end of said secondary winding connected to a second input of said output filter.

6. A method for suppressing radiated electromagnetic interference in power supplies comprising:
   connecting a plurality of rectifier diodes to a secondary winding of a power supply,
   separating individual connections of said plurality of rectifier diodes from other individual connections of said plurality of rectifier diodes within said plurality of rectifier diodes; said individual connections of said plurality of rectifier diodes mechanically and electrically connecting said plurality of diodes to said secondary winding, said separation providing individual impedances for each of said plurality of rectifier diodes;
   modifying said individual connections size and shape with respect to other of said individual connections to adjust said individual impedances; and
   spatially adjusting said individual connections with respect to other of said individual connections to adjust said individual impedances; said individual impedances suppressing radiated electromagnetic interference.

7. A method for suppressing radiated electromagnetic interference in power supplies comprising:
   connecting a plurality of rectifier diodes to a secondary winding of a power supply,
   separating individual connections of said plurality of rectifier diodes from other individual connections of said plurality of rectifier diodes within said plurality of rectifier diodes; said individual connections of said plurality of rectifier diodes mechanically and electrically connecting said plurality of diodes to said secondary winding, said separation providing individual impedances for each of said plurality of rectifier diodes;
   modifying said individual connections material composition with respect to other of said individual connections to adjust said individual impedances; and
   spatially adjusting said individual connections with respect to other of said individual connections to adjust said individual impedances; said individual impedances suppressing radiated electromagnetic interference.

8. A method for suppressing radiated electromagnetic interference in power supplies comprising:
   connecting a plurality of rectifier diodes to a secondary winding of a power supply,
   separating individual connections of said plurality of rectifier diodes from other individual connections of said plurality of rectifier diodes within said plurality of rectifier diodes; said individual connections, of said plurality of rectifier diodes mechanically and electrically connecting said plurality of diodes to said secondary winding, said separation providing individual impedances for each of said plurality of rectifier diodes;
   modifying said individual connections size and shape with respect to other of said individual connections to adjust said individual impedances;
   modifying said individual connections material composition with respect to other of said individual connections to adjust said individual impedances; and
   spatially adjusting said individual connections with respect to other of said individual connections to adjust said individual impedances; said individual impedances suppressing radiated electromagnetic interference.

* * * * *